US008319991B2

(12) United States Patent
Sakata

(10) Patent No.: US 8,319,991 B2
(45) Date of Patent: Nov. 27, 2012

(54) FACSIMILE APPARATUS FOR RECEIVING IMAGE DATA FROM AN EXTERNAL APPARATUS AND SENDING IMAGE DATA TO THE EXTERNAL APPARATUS IN THE SAME CONNECTION SESSION

(75) Inventor: Munetaka Sakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1243 days.

(21) Appl. No.: 11/752,749

(22) Filed: May 23, 2007

(65) Prior Publication Data

US 2007/0279700 A1     Dec. 6, 2007

(30) Foreign Application Priority Data

Jun. 1, 2006   (JP) ................................ 2006-152945

(51) Int. Cl.
*G06F 3/12* (2006.01)
(52) U.S. Cl. ...... 358/1.15; 358/1.13; 358/400; 358/401; 358/402; 358/434; 358/435; 379/100.01
(58) Field of Classification Search .................. 358/1.13, 358/1.15, 400–402, 434, 435; 379/100.1–100.17
See application file for complete search history.

(56) References Cited

U.S. PATENT DOCUMENTS

| 5,293,253 | A * | 3/1994 | Kida et al. ..................... 358/440 |
| 6,400,465 | B1 * | 6/2002 | Nishiyama et al. ........... 358/1.16 |
| 6,594,351 | B1 * | 7/2003 | Bhogal et al. ............. 379/100.01 |
| 6,721,059 | B1 * | 4/2004 | Sturgeon et al. ............. 358/1.15 |
| 6,836,538 | B1 * | 12/2004 | Johnston .................. 379/100.17 |
| 6,903,838 | B1 * | 6/2005 | Hanson et al. ............... 358/1.15 |
| 7,057,762 | B1 * | 6/2006 | Watanabe ..................... 358/1.16 |
| 7,440,463 | B1 * | 10/2008 | Molloy .......................... 370/401 |
| 7,847,970 | B1 * | 12/2010 | McGrady ..................... 358/1.18 |
| 2004/0259544 | A1 * | 12/2004 | Amos ........................ 455/435.1 |
| 2005/0058123 | A1 * | 3/2005 | Horiba .......................... 370/352 |
| 2005/0190404 | A1 * | 9/2005 | Nakamura ................... 358/1.15 |
| 2006/0007486 | A1 * | 1/2006 | Tanimoto ..................... 358/1.15 |
| 2006/0184676 | A1 * | 8/2006 | Tanimoto ...................... 709/227 |
| 2007/0115978 | A1 * | 5/2007 | Kondo .......................... 370/392 |
| 2007/0141977 | A1 * | 6/2007 | O'Hanlon .................... 455/3.01 |

FOREIGN PATENT DOCUMENTS

| JP | 02-192239 A | 7/1990 |
| JP | 4-152755 A | 5/1992 |
| JP | 6-070070 A | 3/1994 |
| JP | 8-293979 A | 11/1996 |
| JP | 09-270906 A | 10/1997 |
| JP | 2000-184159 A | 6/2000 |
| JP | 2002-118758 A | 4/2002 |
| JP | 2006-067045 A | 3/2006 |

\* cited by examiner

*Primary Examiner* — Benjamin O Dulaney
(74) *Attorney, Agent, or Firm* — Canon USA, Inc., IP Division

(57) ABSTRACT

An information processing apparatus is configured to communicate image data with an external apparatus connected to the information processing apparatus via a network. The information processing apparatus includes a memory unit configured to store first image data, a receiving unit configured to establish a communication session with the external apparatus in response to a request from the external apparatus and receive second image data from the external apparatus, a determination unit configured to determine whether to transmit the first image data to the external apparatus, and a transmission unit configured to transmit the first image data to the external apparatus using the established communication session based on the result of the determination made by the determination unit.

6 Claims, 10 Drawing Sheets

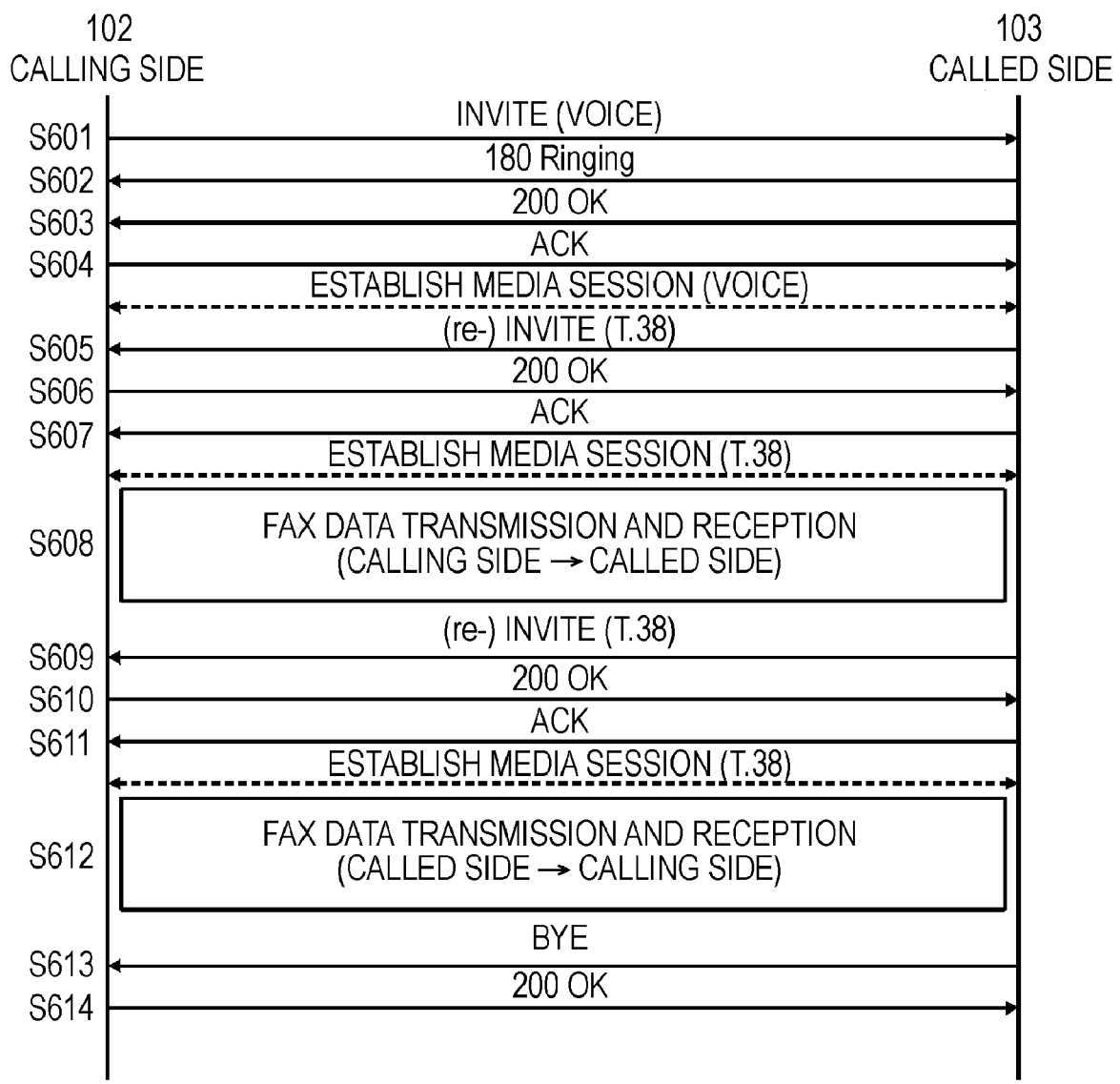

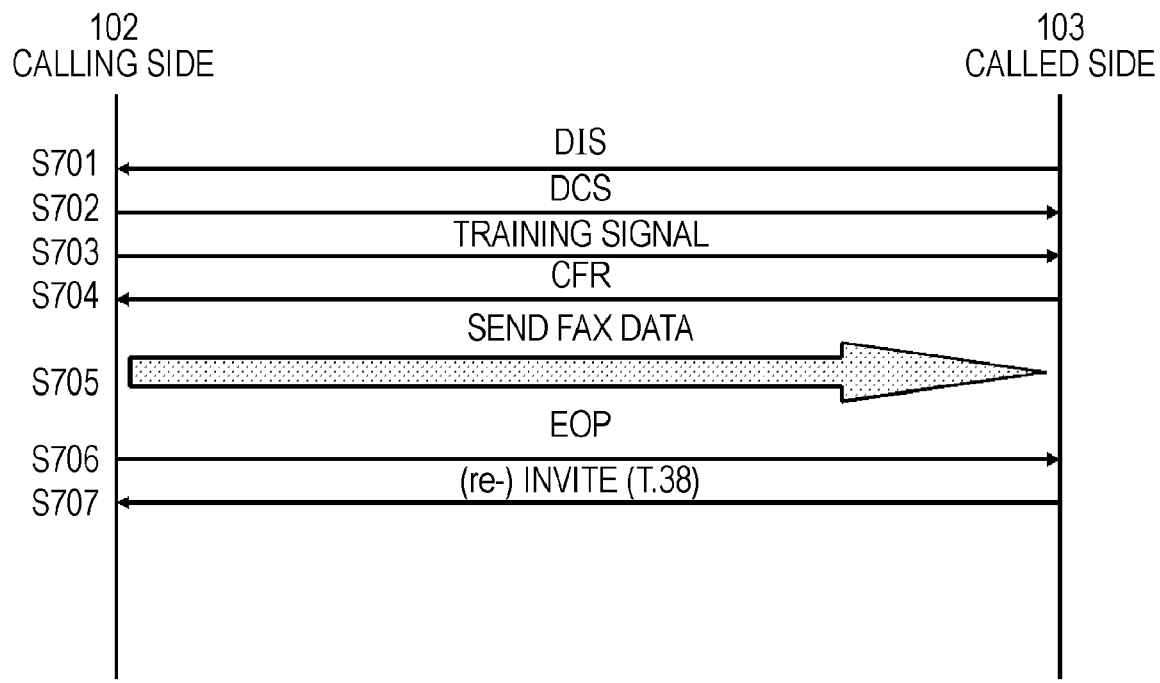
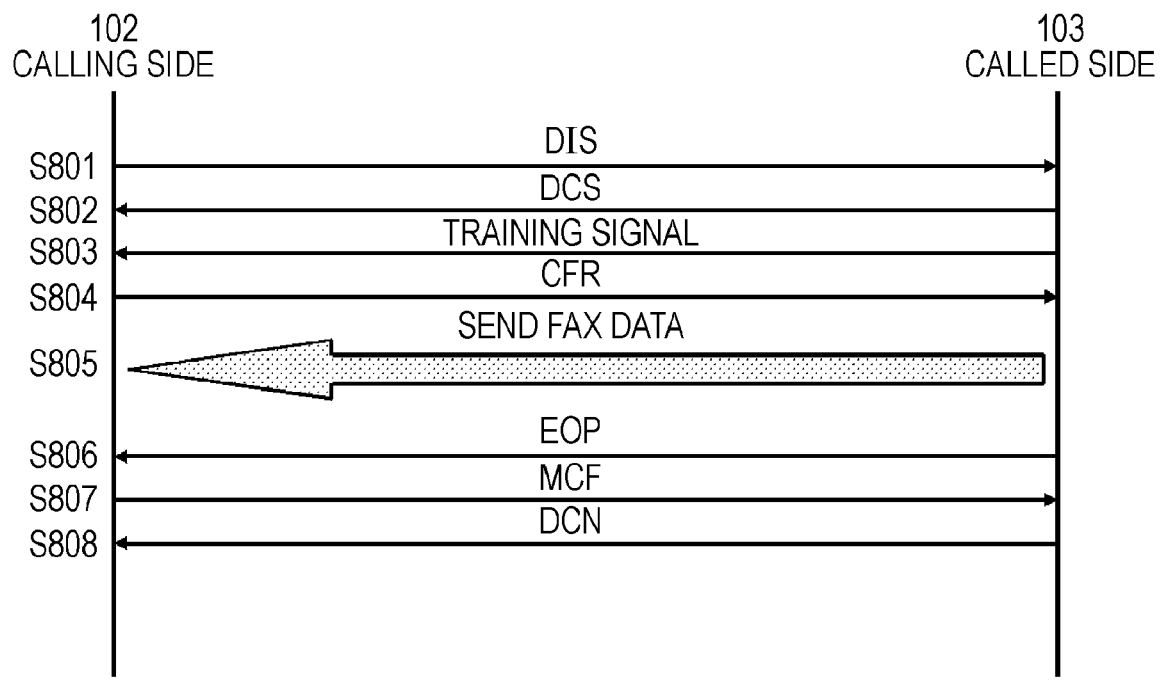

FIG. 9

```
INVITE sip : receive@localdomain SIP / 2.0
Via : SIP / 2.0 / UDP  send-pc.localdomain ; branch=z9hG4bKnashds8
Max-Forwards : 70
To : receive  <sip : receive@localdomain>
From : send <sip : send@localdomain> ; tag=1928301774
Call-ID : a84b4c76e66710
CSeq : 1  INVITE
Contact : <sip : send@send-pc.localdomain>
Supportted : replaces
Allow : INVITE, ACK, CANCEL, BYE, PRACK, MESSAGE, NOTIFY, REFER
Content-Type : application / sdp
Content-Length : 142
[LINE FEED]
REMAINDER OMITTED
```

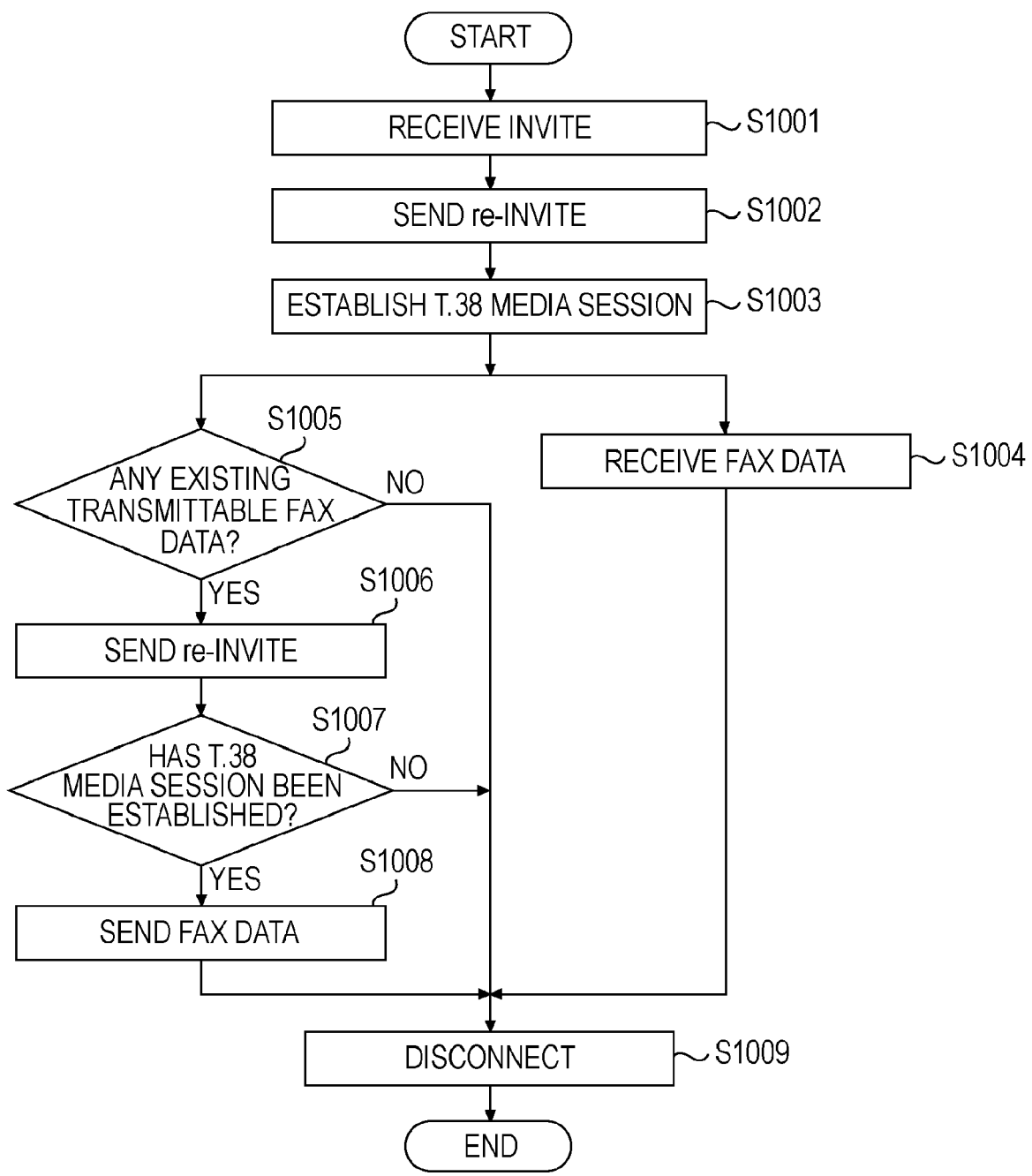

FIG. 13

STORAGE MEDIUM SUCH AS FD/CD-ROM

| DIRECTORY INFORMATION |
|---|
| FIRST DATA PROCESSING PROGRAM PROGRAM CODE GROUP CORRESPONDING TO STEPS IN FLOWCHART IN FIG. 10 |
| SECOND DATA PROCESSING PROGRAM PROGRAM CODE GROUP CORRESPONDING TO STEPS IN FLOWCHART IN FIG. 12 |
| |

MEMORY MAP OF STORAGE MEDIUM

FACSIMILE APPARATUS FOR RECEIVING IMAGE DATA FROM AN EXTERNAL APPARATUS AND SENDING IMAGE DATA TO THE EXTERNAL APPARATUS IN THE SAME CONNECTION SESSION

BACKGROUND OF THE INVENTION

1. Field of the Invention

The present invention relates to an information processing apparatus that has a function of communicating image data with an external apparatus, a method for controlling the same, a program, and a storage medium.

2. Description of the Related Art

Facsimile machines have been used as tools for transmitting information between offices that are distant from each other. In methods for transmitting information using facsimile machines, data that needs to be transmitted is transmitted as image data via a public switched telephone network (PSTN) line or an integrated services digital network (ISDN) line, and the data is output on recording paper on a receiving side.

A strong demand to reduce the communication costs of facsimile transmission and reception has existed, and various proposals have been made to reduce the communication costs. For example, a method is proposed in Japanese Patent Laid-Open No. 2002-118758, in which, in order to perform two-way facsimile communication in the same call, after facsimile transmission is completed, the transmit mode and receive mode of terminals are interchanged by a receiver sending a transmit-receive switching signal to a sender.

This method is a unique method that is not based on International Telecommunication Union-Telecommunication Standardization Sector (ITU-T) standard T.30. However, in this method, since facsimile transmission and reception can be performed in the same call, no additional connection fee for a return call is necessary. Thus, the communication costs can be reduced.

Moreover, a method is proposed in Japanese Patent Laid-Open No. 6-70070, in which, when a calling side polls a called side and receives data from the called side, the called side also sends documents other than a document subjected to polling to the calling side. In this method, a confidential transmit file and the like, together with a document subjected to polling, can be sent. Thus, in comparison with a case where only a document subjected to polling is sent, in this case, the communication costs can be largely reduced, as in the case shown in Japanese Patent Laid-Open No. 2002-118758.

Facsimile communication according to the known T.30 standard is one-way communication from a calling side to a called side or from the called side to the calling side. An object of the methods proposed in Japanese Patent Laid-Open Nos. 2002-118758 and 6-70070 is to reduce the communication costs under restrictions due to one-way communication.

On the other hand, recently, Internet Protocol (IP) networks based on local area networks (LANs) and the Internet have rapidly become widespread, and known methods for transmitting facsimile information are changing. Specifically, a method has been developed, in which real-time facsimile transmission is performed via IP networks using Session Initiation Protocol (SIP) (refer to Internet Engineering Task Force (IETF) Request for Comment (RFC) 3261) for managing communication sessions and ITU-T standard T.38 (hereinafter called T.38).

An advantage of using real-time facsimile transmission according to SIP and T.38 is that two-way communication in the same call can be performed using SIP, which is universally defined. Thus, in comparison with cases where the aforementioned known methods are adopted, in a case where real-time facsimile transmission according to SIP and T.38 is adopted, the communication costs can be largely reduced taking advantage of two-way communication.

The present invention provides a mechanism to determine whether to transmit image data from a called side to a calling side using a communication session established for transmitting image data from the calling side to the called side, and transmit image data from the called side to the calling side on the basis of the result of the determination.

SUMMARY OF THE INVENTION

The present invention provides an information processing apparatus, a method for controlling the same, a program, and a storage medium that overcomes the above-described disadvantages.

According to an aspect of the present invention, an information processing apparatus is provided which is configured to communicate image data with an external apparatus connected to the information processing apparatus via a network. The information processing apparatus includes a memory unit configured to store first image data, a receiving unit configured to establish a communication session with the external apparatus in response to a request from the external apparatus and receive second image data from the external apparatus, a determination unit configured to determine whether to transmit the first image data to the external apparatus, and a transmission unit configured to transmit the first image data to the external apparatus using the established communication session on the basis of the result of the determination made by the determination unit.

According to another aspect of the present invention, an information processing apparatus is provided which is configured to communicate image data with an external apparatus connected to the information processing apparatus via a network. The information processing apparatus includes a transmission unit configured to establish a communication session with the external apparatus and transmit first image data to the external apparatus, a determination unit configured to determine whether to receive second image data upon being requested to receive the second image data by the external apparatus, and a receiving unit configured to receive the second image data from the external apparatus using the established communication session on the basis of the result of the determination made by the determination unit.

Further features and aspects of the present invention will become apparent from the following description of exemplary embodiments with reference to the attached drawings.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 6 is a timing chart showing first communication processing in the information processing apparatuses in an exemplary embodiment.

FIG. 7 is a timing chart showing the first communication processing in the information processing apparatuses in the exemplary embodiment.

FIG. 8 is a timing chart showing the first communication processing in the information processing apparatuses in the exemplary embodiment.

FIG. 9 shows exemplary SIP header information that is sent from the information processing apparatuses in an exemplary embodiment.

FIG. 10 is a flowchart showing second communication processing in the information processing apparatuses in an exemplary embodiment.

FIG. 13 shows a memory map of a storage medium for storing various types of data processing program that can be read by the information processing apparatuses according to an exemplary embodiment of the present invention.

DESCRIPTION OF THE EMBODIMENTS

Description of System Configuration

Exemplary embodiments of the present invention will now herein be described in detail with reference to the drawings. The drawings described in the exemplary embodiments are illustrative, and the scope of the present invention is not intended to be restricted by the drawings.

Figure 1:
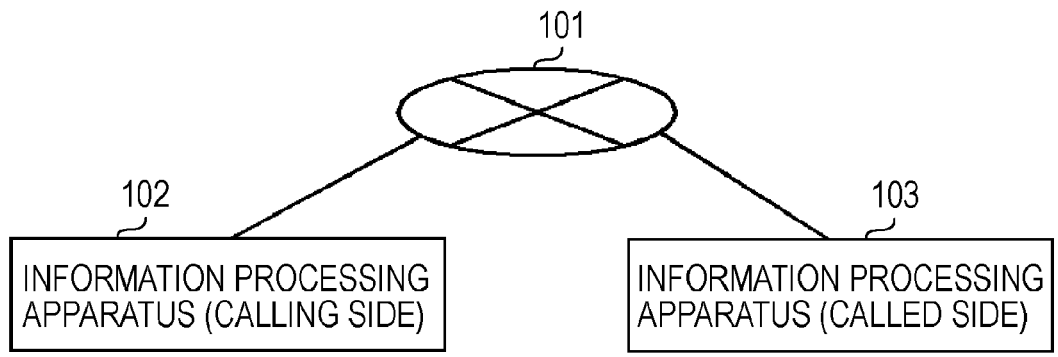
FIG. 1 is a network configuration diagram showing the configuration of an exemplary information communication system to which information processing apparatuses according to exemplary embodiments of the present invention are applicable.

FIG. 1 is a network configuration diagram showing the configuration of an exemplary information communication system to which information processing apparatuses according to the exemplary embodiments of the present invention are applicable. The information communication system includes a network 101 such as the Internet or an intranet to which a plurality of information processing apparatuses 102 and 103 are connected. In the exemplary embodiments, the example is the information communication system, which includes the information processing apparatuses 102 and 103, which can perform communication using a predetermined protocol via the network 101. The information communication system may further include an image forming apparatus and the like so far as the image forming apparatus and the like are information processing apparatuses that have a data communication function using the aforementioned predetermined protocol. In this case, the predetermined protocol is SIP.

The information processing apparatuses 102 and 103 have a plurality of functions, for example, a copy function, a print function, a facsimile function, a scanning function, and a box function.

The information processing apparatuses 102 and 103 further have a call function according to SIP (IETF RFC 3261) and a communication function according to ITU-T standard T.38. In FIG. 1, the information processing apparatuses 102 and 103 are connected to each other via the network 101 and perform call connection according to SIP and communication according to ITU-T standard T.38 via the network 101.

It is noted that a SIP server defined in IETF RFC 3261 Session Initiation Protocol may be used in call control according to SIP.

Figure 2:
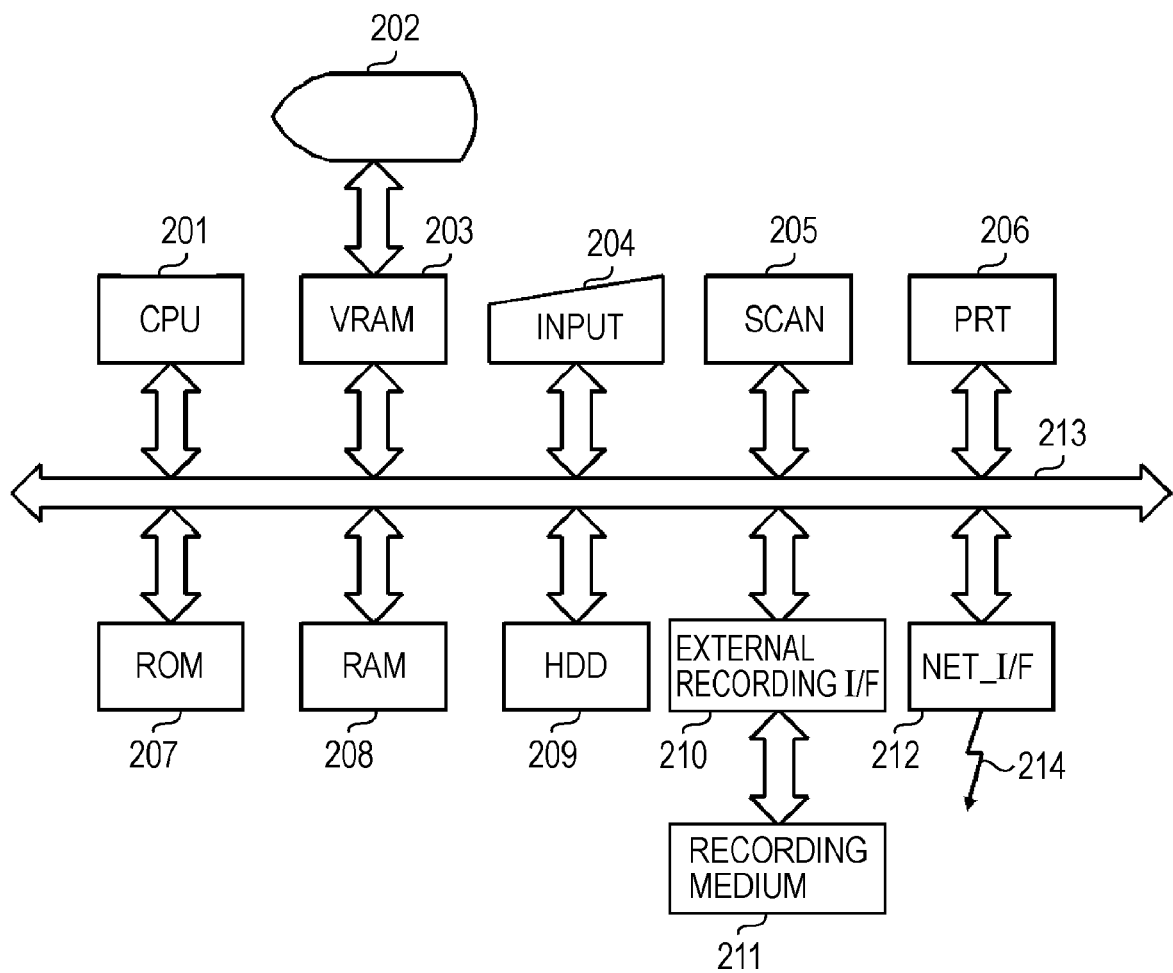
FIG. 2 is a block diagram showing an example architecture of each of the information processing apparatuses shown in FIG. 1.

FIG. 2 is a block diagram showing the structure of each of the information processing apparatuses 102 and 103 shown in FIG. 1. The information processing apparatuses 102 and 103 each include a central processing unit (CPU) 201, a display unit 202, a video random access memory (VRAM) 203, an input device 204, a scanner unit (SCAN) 205, a printer unit 206, a read only memory (ROM) 207, a random access memory (RAM) 208, a hard disk drive (HDD) 209, an external recording interface 210, a network interface (Net_I/F) 212, and a CPU bus 213. The CPU 201 controls individual devices connected to the CPU 201 according to control programs stored in the ROM 207.

Windows, icons, messages, menus, and other items of user interface information are displayed on the display screen of the display unit 202. Images to be displayed on the display unit 202 are drawn in the VRAM 203. Image data generated in the VRAM 203 is transferred to the display unit 202 according to predetermined rules, and images are displayed on the display unit 202. The input device 204 includes various types of key for specifying, for example, the number of copies, a screen pointing device for pointing to icons, menus, and other objects displayed on the display unit 202, and the like.

The scanner unit 205 reads an original document to be copied. The printer unit 206 prints out print data stored in the RAM 208, the HDD 209, or the like. The ROM 207 stores various types of control program and data. The RAM 208 includes a work area for the CPU 201, a save area for saving data for error handling, an area for loading control programs, and the like.

The HDD 209 is an internal recording unit and stores various types of control program, print data, and the like. The external recording interface 210 writes and reads data to and from a recording medium 211. The recording medium 211 is a detachable recording medium such as a universal serial bus (USB) memory. The network interface 212 can communicate with another information processing apparatus, a printer, and the like via a network 214. The CPU bus 213 includes an address bus, a data bus, and a control bus. Control programs are supplied from the ROM 207 to the CPU 201.

Figure 3:
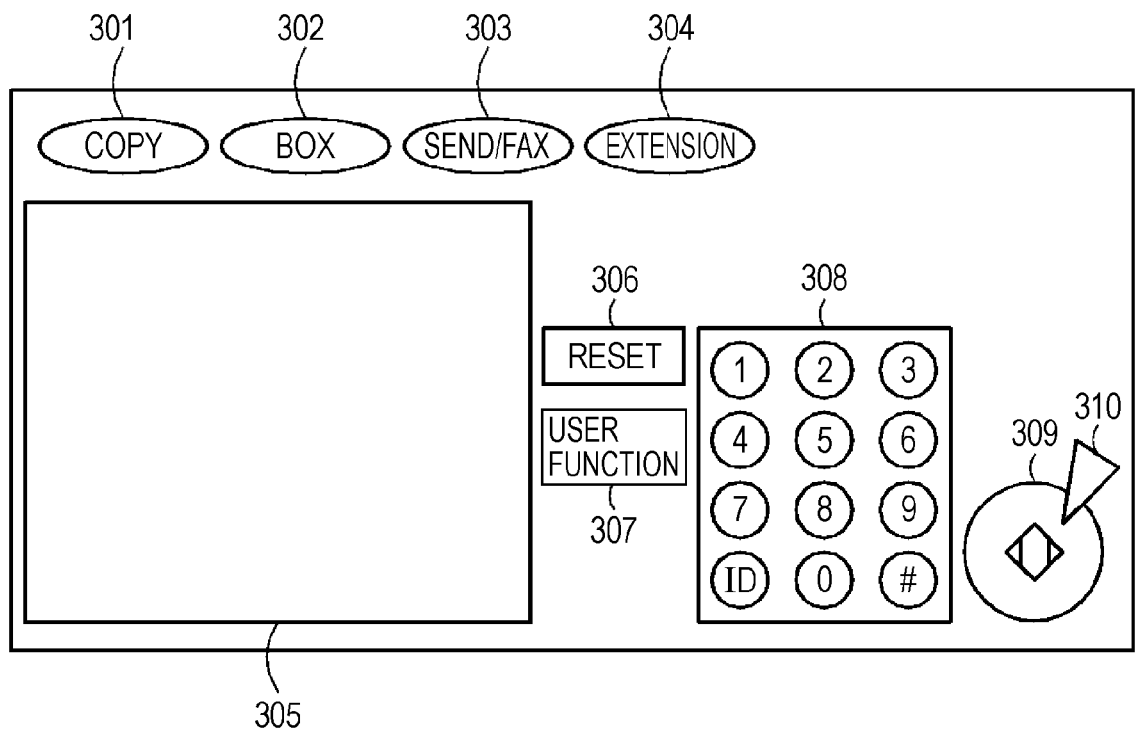
FIG. 3 shows an exemplary operation panel of each of the information processing apparatuses shown in FIG. 1.

FIG. 3 shows an exemplary operation panel (the display unit 202 and the input device 204) of each of the information processing apparatuses 102 and 103 shown in FIG. 1. The operation panel includes a reset key 306, a user function key 307, a numeric keypad 308, a start key 309, a stop key 310, and a liquid crystal panel 305 (a touch panel). The operation panel further includes a copy function key 301, a box function key 302, a send/facsimile function key 303, and an extended function key 304.

The reset key 306 is used to cancel entries entered from the numeric keypad 308 or the liquid crystal panel 305 and return to the initial screen. The user function key 307 is used to invoke screens for various types of settings, an address book, and the like for each user stored in each of the information processing apparatuses 102 and 103. The numeric keypad 308 is used to enter numbers. The start key 309 is used to start copying and scanning operations, and the operations are stopped using the stop key 310.

A user presses the copy function key 301 to use a copy function and the box function key 302 to use a box function in the information processing apparatus 102 or 103.

The box function is a function of storing image data generated from print data (page description language (PDL) data)

sent from a host computer, scanned image data, and the like in areas, assigned to individual document boxes, in the HDD 209.

Image data and attribute information associated with the image data for each job are stored in each box, and a stored document is called a job document. The user can perform various types of processing, for example, printing or deleting job documents stored in the storage areas in the HDD 209 in the information processing apparatus 102 or 103, at any time using the box function.

The send/facsimile function key 303 is used to send data of, for example, an original document or a job document to a host computer, another information processing apparatus, or the like via networks. The extended function key 304 is used to manipulate PDL data.

Figure 4:
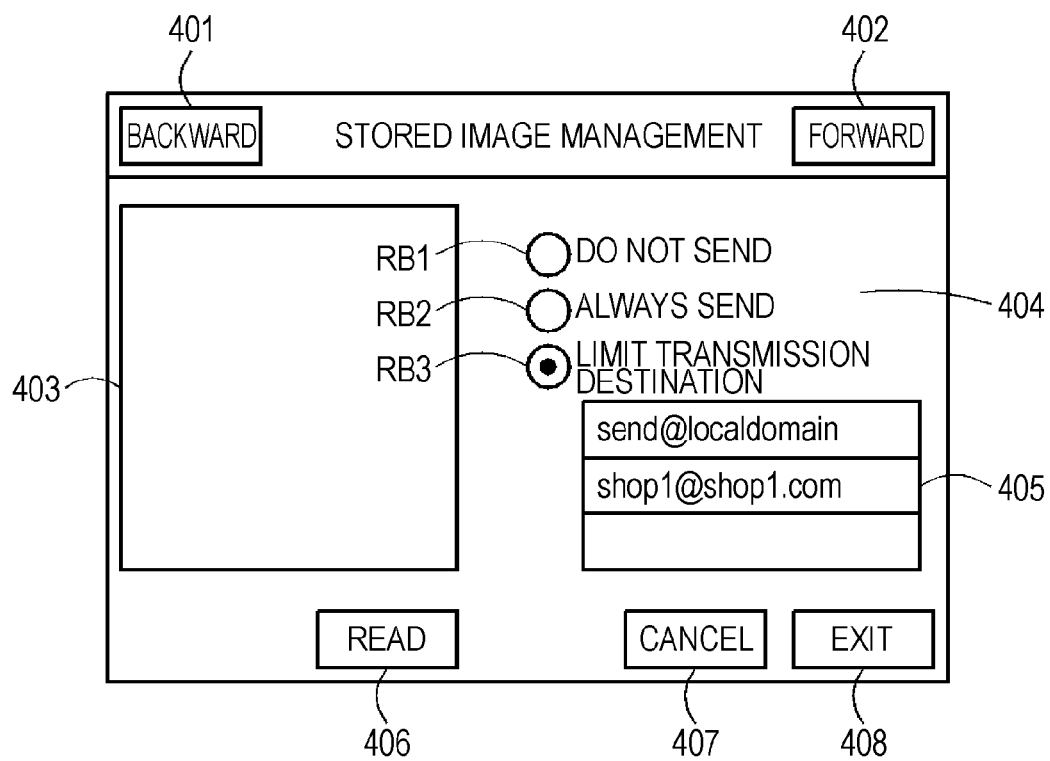
FIG. 4 shows an exemplary stored image management screen that is displayed on the operation panel of each of the information processing apparatuses shown in FIG. 1.

FIG. 4 shows an exemplary stored image management screen that is displayed in each of the information processing apparatuses 102 and 103 shown in FIG. 1. The stored image management screen is used to store images and set transmission destinations of the stored images. The stored image management screen can be invoked using the user function key 307 provided in the operation panel. The stored document management screen includes a backward key 401, a forward key 402, an image display 403, a transmission condition check box 404, a transmission destination entry box 405, a read key 406, a cancel key 407, and an exit key 408.

The backward key 401 and the forward key 402 are used to display stored images other than the currently displayed image when a plurality of stored images exist.

In a case where a plurality of stored images exist in the HDD 209 in each of the information processing apparatuses 102 and 103, when the backward key 401 or the forward key 402 is pressed, the screen display of the image display 403, the transmission condition check box 404, and the transmission destination entry box 405 changes. Thus, settings can be configured for each of the stored images in the HDD 209 in each of the information processing apparatuses 102 and 103.

The image display 403 is an area on which a stored image is previewed. The user can check a stored image by viewing an image displayed on the image display 403. In the transmission condition check box 404, one of the following three conditions for transmitting a stored image can be selected: DO NOT SEND, ALWAYS SEND, and LIMIT TRANSMISSION DESTINATION.

The transmission destination entry box 405 is enabled when LIMIT TRANSMISSION DESTINATION is selected in the transmission condition check box 404. When the user needs to enter a transmission destination in the transmission destination entry box 405, the user directly enters the transmission destination from a soft keyboard. The soft keyboard appears when an area on which blank fields are displayed or an area on which SIP addresses are displayed in the transmission destination entry box 405 is touched.

When the read key 406 is pressed, the scanner unit 205 reads an original document put in a document stand, and a read image is displayed on the image display 403. The user presses the cancel key 407 when the user needs to cancel additions and changes made after the stored image management screen is displayed.

The user presses the exit key 408 when the user needs to store additions and changes made after the stored image management screen is displayed in the HDD 209 and exit the stored image management screen.

When an option button RB1 corresponding to DO NOT SEND is clicked in the transmission condition check box 404, an image currently displayed on the image display 403 is just stored in the HDD 209 and not sent regardless of the transmission destination SIP address.

When an option button RB2 corresponding to ALWAYS SEND is clicked, an image currently displayed on the image display 403 is sent regardless of the transmission destination SIP address. When an option button RB3 corresponding to LIMIT TRANSMISSION DESTINATION is clicked, an image currently displayed on the image display 403 is sent only when data is received by facsimile transmission from SIP addresses described in the transmission destination entry box 405. In the case shown in FIG. 4, two SIP addresses send@localdomain and shop1@shop1.com are registered as transmission destination SIP addresses.

Figure 5:
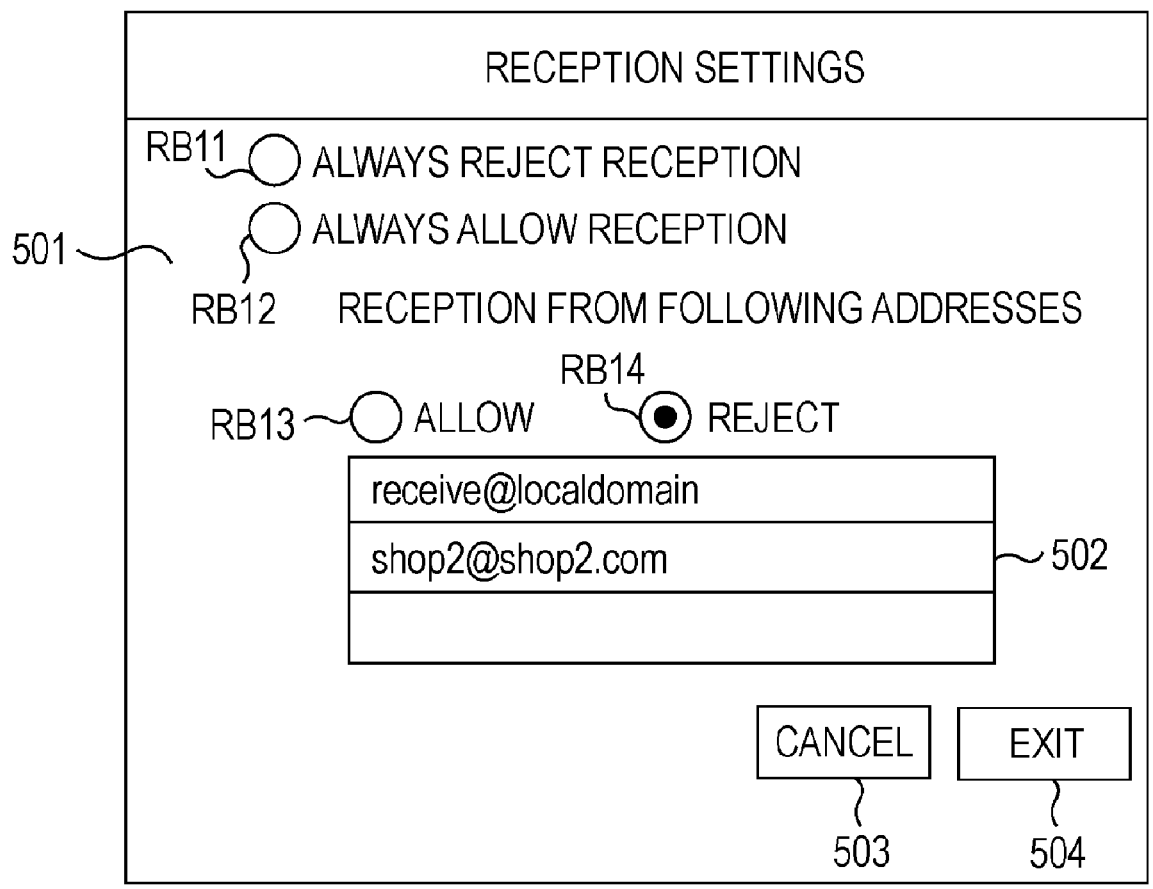
FIG. 5 shows an exemplary reception settings screen that is displayed on the operation panel of each of the information processing apparatuses shown in FIG. 1.

FIG. 5 shows an exemplary reception settings screen that is displayed on the display unit 202 in each of the information processing apparatuses 102 and 103 shown in FIG. 1. The reception settings screen is used to specify whether a facsimile transmission request from a called side is accepted when facsimile transmission is performed by SIP and T.38 communication. The reception settings screen can be invoked using the user function key 307. The reception settings screen includes a reception condition check box 501, an address entry box 502, a cancel key 503, and an exit key 504. In the reception condition check box 501, one of four conditions can be selected.

When facsimile transmission is performed by communication according to T.38, it can be specified using the reception condition check box 501 whether facsimile data is accepted from a transmission destination. The address entry box 502 is enabled when ALLOW or REJECT is selected in the reception condition check box 501.

When the user needs to enter an address in the address entry box 502, the user enters the address from the aforementioned soft keyboard. The soft keyboard appears when an area on which blank fields are displayed or an area on which SIP addresses are displayed in the address entry box 502 is touched.

The user presses the cancel key 503 when the user needs to cancel changes made after the reception settings screen is displayed. The user presses the exit key 504 when the user needs to store changes made after the reception settings screen is displayed in the HDD 209 and exit the reception settings screen.

When an option button RB11 corresponding to ALWAYS REJECT RECEPTION is clicked in the reception condition check box 501, the information processing apparatus always rejects a facsimile transmission request regardless of the transmission source SIP address.

When an option button RB12 corresponding to ALWAYS ALLOW RECEPTION is clicked, the information processing apparatus always accepts a facsimile transmission request regardless of the transmission source SIP address. When an option button RB13 corresponding to ALLOW RECEPTION FROM FOLLOWING ADDRESSES is clicked, the information processing apparatus accepts a facsimile transmission request only from SIP addresses described in the address entry box 502.

When an option button RB14 corresponding to REJECT RECEPTION FROM FOLLOWING ADDRESSES is clicked, the information processing apparatus rejects a facsimile transmission request only from SIP addresses described in the address entry box 502. In the case shown in FIG. 5, two SIP addresses receive@localdomain and shop2@shop2.com are registered as unacceptable SIP addresses.

First Communication Processing

In a first exemplary embodiment, a case is described, in which, when the information processing apparatus 102 (calling side) has completed facsimile transmission to the information processing apparatus 103 (called side) by SIP and T.38 communication, the information processing apparatus 103 sends a reception completion notice to the information processing apparatus 102 in the same call (the same session).

The information processing apparatuses 102 and 103 shown in FIG. 1 have a function of performing data communication with another information processing apparatus via the network 101. The information processing apparatuses 102 and 103 mutually perform facsimile transmission using SIP and T.38 communication in one session, as described below. In this case, the network is an IP network.

The information processing apparatus 103 accepts a connection request from the information processing apparatus 102. The information processing apparatus 103 has a receive function of receiving a first data transmission job and a transmit function of changing the connection state of the aforementioned communication network and sending a second data transmission job to the information processing apparatus 102 in the same session that is initiated by the connection request.

The information processing apparatus 102 has a transmit function of sending the first data transmission job to the information processing apparatus 103 by facsimile transmission using SIP and T.38 communication. The information processing apparatus 102 further has a receive function of receiving the second data transmission job from the information processing apparatus 103 by facsimile transmission in the same session, which is initiated by the connection request.

In the first communication processing, after transmission of the first data transmission job is completed, transmission of the second data transmission job is performed.

FIGS. 6, 7, and 8 are timing charts showing the first communication processing in the information processing apparatuses in an exemplary embodiment. Reference letters S601 to S614, S701 to S707, and S801 to S808 denote individual steps.

In the following description, a session means a series of exchanges between the information processing apparatuses 102 and 103 during a period between the time when communication is initiated by a call from the information processing apparatus 102 and the time when the information processing apparatus 102 completes the communication via the IP network by sending a success response (200 OK) to the information processing apparatus 103 in response to a completion request (BYE) from the information processing apparatus 103.

In step S601, the information processing apparatus 102 (calling side) first sends a connection request (INVITE) for a voice call to connect to the information processing apparatus 103 (called side). Then, in step S602, the information processing apparatus 103 (called side) returns a temporary response during a call (180 Ringing).

Then, in step S603, the information processing apparatus 103 (called side) returns a success response (200 OK) in response to the connection request (INVITE). Then, in step S604, the information processing apparatus 102 (calling side) sends a confirmation message (ACK) to the information processing apparatus 103 (called side), so that a calling session and a voice media session for a voice call are established.

Then, in step S605, the information processing apparatus 103 (called side) sends a request (INVITE) for adding a T.38 communication media session to the information processing apparatus 102 (calling side) to add a T.38 communication media session to the aforementioned calling session, which has been established. In general, this operation is called re-INVITE. In step S606, the information processing apparatus 102 (calling side) returns a success response (200 OK) upon receiving this request.

Then, in step S607, the information processing apparatus 103 (called side) sends a confirmation message (ACK), so that addition of the T.38 communication media session is completed. After the T.38 media session is established in this way, in step S608, the information processing apparatus 102 (calling side) performs facsimile transmission according to T.38 in the T.38 communication media session.

Then, the information processing apparatus 103 (called side) confirms completion of facsimile reception by receiving an end-of-page (EOP) signal. Then, in step S609, the information processing apparatus 103 (called side) sends a request (INVITE) for adding a T.38 communication media session to the calling session again to send a reception completion notice.

FIG. 7 is a timing chart showing the details of steps S608 and S609 shown in FIG. 6. Steps S701 to S706 in FIG. 7 correspond to step S608 in FIG. 6 and are processing according to T.38.

When the information processing apparatus 102 (calling side) has received a digital identification signal (DIS) from the information processing apparatus 103 (called side) in step S701, the information processing apparatus 102 (calling side) sends a digital command signal (DCS) to the information processing apparatus 103 (called side) in step S702.

Then, after the information processing apparatus 102 (calling side) sends a training signal in step S703, when the information processing apparatus 102 (calling side) has received a confirmation-to-receive (CFR) signal from the information processing apparatus 103 (called side) in step S704, the information processing apparatus 102 (calling side) determines that the information processing apparatus 103 (called side) is ready to receive facsimile data. Then, in step S705, the information processing apparatus 102 (calling side) sends facsimile data. When transmission of the last page is completed, in step S706, the information processing apparatus 102 (calling side) sends an EOP signal to the information processing apparatus 103 (called side), the EOP signal indicating completion of transmission of the last page.

At this time, when the information processing apparatus 103 (called side) sends a message confirmation (MCF), the information processing apparatus 102 (calling side) determines that facsimile transmission from the information processing apparatus 102 (calling side) to the information processing apparatus 103 (called side) has been completed. Then, a completion request (BYE) for completing the calling session according to SIP is sent. In this case, the information processing apparatus 103 (called side) cannot perform facsimile transmission to the information processing apparatus 102 (calling side) using the same call.

Thus, the information processing apparatus 102 (calling side) can be prevented from disconnecting the call by the information processing apparatus 103 (called side) sending re-INVITE in step S707 (step S609 in FIG. 6) upon receiving the EOP signal in step S706.

Returning to FIG. 6, in step S610, the information processing apparatus 102 (calling side), which has received re-INVITE in step S609, returns a success response (200 OK) in step S610. Then, when the information processing apparatus 103 (called side) returns a confirmation message (ACK) to the information processing apparatus 102 (calling side) in step S611, a T.38 communication media session is added. In step S612, the information processing apparatus 103 (called side)

performs facsimile transmission according to T.38 in the T.38 communication media session, which has been newly established.

FIG. 8 is a timing chart showing the details of step S612 shown in FIG. 6. Steps S801 to S808 show processing according to T.38. The directions of transmission and reception in steps S801 to S806 are opposite to those in steps S701 to S706, and thus the directions of sending signals in steps S801 to S806 are opposite to those in steps S701 to S706. However, the meaning of each signal in steps S801 to S806 is the same as that in steps S701 to S706. Thus, the description of steps S801 to S806 is omitted.

In step S807, the information processing apparatus 102 (calling side) sends an MCF. Then, upon receiving a disconnect (DCN) signal from the information processing apparatus 103 (called side) in step S808, the information processing apparatus 102 (calling side) determines that facsimile reception has been completed.

Returning to FIG. 6, when facsimile transmission in step S612 has been completed, in step S613, the information processing apparatus 103 (called side) sends a completion request (BYE) for completing the calling session. Then, the call and media session are completed by the information processing apparatus 102 (calling side), which has received the completion request (BYE), returning a success response (200 OK) in step S614.

In the aforementioned arrangement, according to SIP and T.38 protocol, when facsimile reception has been completed, facsimile transmission can be performed in the same call. Thus, the communication costs in real-time facsimile transmission via IP networks can be reduced.

Specifically, an advantage can be achieved, in which a calling side can obtain additional information such as a reception notice from a called side without additional fees merely by sending images that need to be sent by facsimile transmission. Moreover, another advantage can be achieved, in which a called side can send additional information such as the result of reception or a notice of moving to a calling side without fees. Moreover, yet another advantage can be achieved, in which, when a calling side does not need additional information from a called side, reception of the additional information can be rejected by configuring settings of a calling terminal.

In a modification of the first communication processing, transmission of the second data transmission job may be performed before transmission of the first data transmission job is completed.

Second Communication Processing

In second communication processing, a case is described, in which, while the information processing apparatus 102 (calling side) performs facsimile transmission to the information processing apparatus 103 (called side) using SIP and T.38 communication, the information processing apparatus 103 (called side) sends a stored image to the information processing apparatus 102 (calling side) in the same call.

In the second communication processing, the first and second data transmission jobs are sent at the same time.

FIG. 9 shows exemplary SIP header information that is sent from the information processing apparatuses in an exemplary embodiment. The SIP header information shown in FIG. 9 is sent when the information processing apparatus 102 (calling side) sends a connection request to the information processing apparatus 103 (called side) (corresponding to step S601 in the timing chart in FIG. 6).

In FIG. 9, sip: receive@localdomain in the fourth line indicates a transmission destination SIP address and corresponds to the SIP address of the information processing apparatus 103 (called side) in the exemplary embodiments. Moreover, sip: send@localdomain in the fifth line indicates a transmission source SIP address and corresponds to the SIP address of the information processing apparatus 102 (calling side) in the exemplary embodiments. Since the SIP header includes transmission source and destination SIP addresses, the information processing apparatuses 102 and 103 can obtain information of the transmission source and destination SIP addresses by analyzing the SIP header.

FIG. 10 is a flowchart showing the second communication processing in the information processing apparatuses in an exemplary embodiment. In this case, data communication processing in the information processing apparatus 103 (called side) is shown. Reference letters S1001 to S1009 denote individual steps. The individual steps are implemented by the CPU 201 shown in FIG. 2 loading control programs from the ROM 207, the HDD 209, or the like into the RAM 208 and executing the control programs.

The second communication processing will now be described with reference to FIGS. 9 and 10. A timing chart of the second communication processing is similar to that shown in FIG. 6.

The information processing apparatus 103 (called side) accepts a connection request from the information processing apparatus 102 (calling side) in step S1001 and establishes a calling session and a voice media session (steps S601 to S604).

Then, in step S1002, the information processing apparatus 103 (called side) sends re-INVITE to establish a T.38 media session. Then, after a T.38 media session is established in step S1003 (steps S605 to S607), the information processing apparatus 103 (called side) performs reception of facsimile data in step S1004 and transmission of stored images in steps S1005 to S1008 in parallel.

Reception of facsimile data in step S1004 corresponds to step S608 in the timing chart shown in FIG. 6. This process is the same as that in the first communication processing, and thus the description is omitted. Transmission of stored images in steps S1005 to S1008 corresponds to steps S609 to S612 in the timing chart shown in FIG. 6.

In step S1005, the CPU 201 in the information processing apparatus 103 (called side) analyzes the SIP header information shown in FIG. 9. Then, the CPU 201 obtains a transmission source SIP address, compares the transmission source SIP address with settings configured on the stored image management screen shown in FIG. 4, and determines whether any stored image data to be sent to the transmission source SIP address exists.

When the CPU 201 determines that no stored image data to be sent exists, transmission of stored images is completed. On the other hand, when the CPU 201 determines in step S1005 that stored image data to be sent exists, the process proceeds to step S1006.

In the exemplary embodiments, stored image data to be sent to send@localdomain exists, the process proceeds to step S1006. In step S1006 (corresponding to step S609), the information processing apparatus 103 (called side) sends re-INVITE to the information processing apparatus 102 (calling side) to add a T.38 media session for sending stored images.

Then, in step S1007, the CPU 201 determines whether a T.38 media session has been established. When the CPU 201 determines that no T.38 media session has been established, transmission of stored image data is completed.

On the other hand, when the CPU 201 determines in step S1007 that a T.38 media session has been established, the process proceeds to step S1008 (corresponding to step S612) where facsimile data is sent. After transmission of stored image data in step S1008 is completed, the information processing apparatus 103 (called side) confirms that reception of facsimile data from the information processing apparatus 102 (calling side) and transmission of stored image data to the information processing apparatus 102 (calling side) have been completed. Then, in step S1009 (corresponding to steps S613 and S614), disconnect processing is performed, and the process is completed.

In the aforementioned arrangement, according to SIP and T.38 protocol, reception of facsimile data and transmission of stored image data can be performed in parallel between the information processing apparatus 102 (calling side) and the information processing apparatus 103 (called side). Since parallel communication can be performed using SIP and T.38, an advantageous effect can be achieved, in which time necessary for transmission and reception is shorter than that in serial communication.

Third Communication Processing

In third communication processing, a case is shown, in which, when the information processing apparatus 103 (called side) performs facsimile transmission to the information processing apparatus 102 (calling side) in the same call, reception of the facsimile transmission is rejected. It is assumed that the conditions for determining whether reception of facsimile transmission is rejected are set in the reception settings screen shown in FIG. 5.

Figure 11:
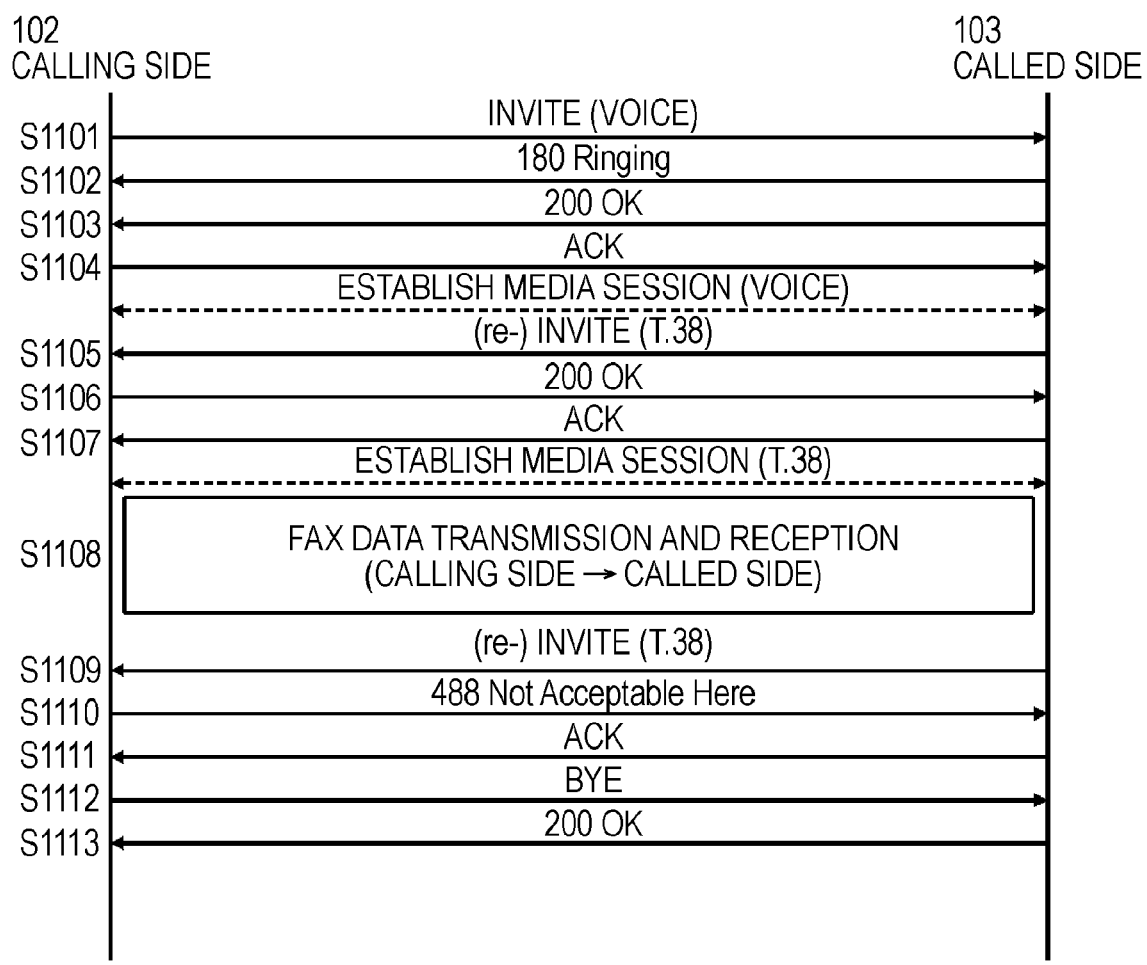
FIG. 11 is a timing chart showing third communication processing in the information processing apparatuses in an exemplary embodiment.

FIG. 11 is a timing chart showing the third communication processing in the information processing apparatuses in an exemplary embodiment. In this case, the timing chart is a timing chart for the information processing apparatus 102 (calling side) and the information processing apparatus 103 (called side).

Steps S1101 to S1109 are similar to steps S601 to S609, and thus the description of steps S1101 to S1109 is omitted.

The information processing apparatus 102 (calling side) returns a failure response (488 Not Acceptable Here) in step S1110 upon receiving re-INVITE in step S1109. The failure response is defined in SIP and is a response for rejecting change of a media session (in this exemplary embodiment, addition of a T.38 media session). The information processing apparatus 103 (called side) recognizes that addition of a T.38 media session has failed and returns a confirmation message (ACK) in step S1111.

Then, in step S1112, the information processing apparatus 102 (calling side) sends a completion request (BYE) for completing the calling session. The call and media session are completed by the information processing apparatus 103 (called side), which has received the completion request (BYE), returning a success response (200 OK) in step S1113.

Figure 12:
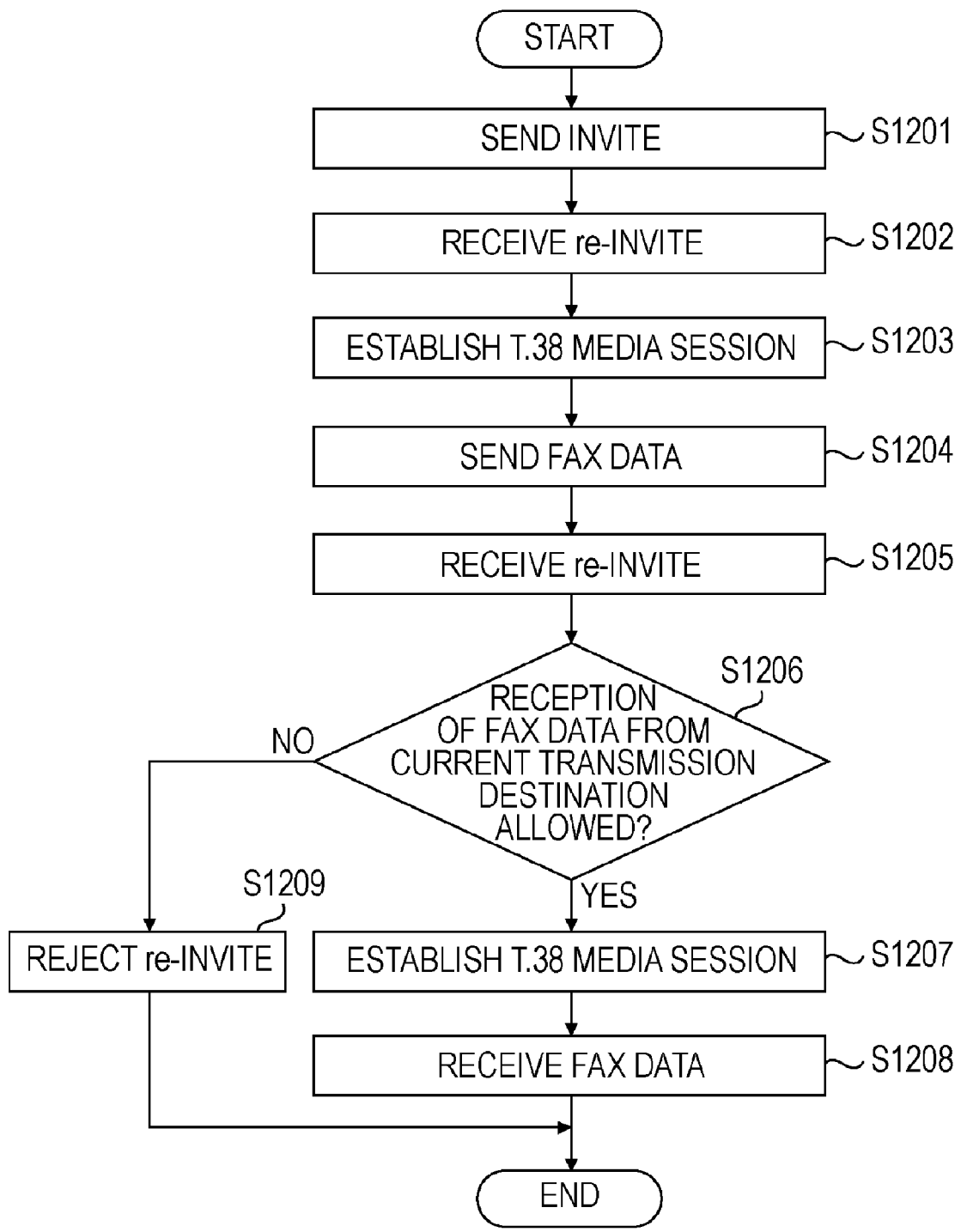
FIG. 12 is a flowchart showing the third communication processing in the information processing apparatuses in an exemplary embodiment.

FIG. 12 is a flowchart showing the third communication processing in the information processing apparatuses in an exemplary embodiment. In this case, data communication processing in the information processing apparatus 102 (calling side) is shown. Reference letters S1201 to S1209 denote individual steps. The individual steps are implemented by the CPU 201 shown in FIG. 2 loading control programs from the ROM 207, the HDD 209, or the like into the RAM 208 and executing the control programs.

The third communication processing will now be described with reference to FIGS. 11 and 12. A timing chart of the third communication processing is similar to that shown in FIG. 6.

In step S1201 (corresponding to steps S1101 to S1104), the information processing apparatus 102 (calling side) sends a connection request to the information processing apparatus 103 (called side) and establishes a calling session and a voice media session. Then, the information processing apparatus 102 (calling side) receives re-INVITE from the information processing apparatus 103 (called side) in step S1202 and establishes a T.38 media session in step S1203 (corresponding to steps S1105 to S1107).

Then, in step S1204 (corresponding to step S1108), the information processing apparatus 102 (calling side) sends facsimile data.

Then, the information processing apparatus 102 (calling side) receives re-INVITE from the information processing apparatus 103 (called side) in step S1205 (corresponding to step S1109) and compares the current transmission destination SIP address with settings configured on the reception settings screen shown in FIG. 5 in step S1206. When it is determined that reception of the facsimile transmission is allowed, the process proceeds to step S1207. Otherwise, the process proceeds to step S1209. In the exemplary embodiments, since settings are configured so that reception of facsimile transmission from receive@localdomain is rejected, the process proceeds to step S1209.

In step S1209 (corresponding to step S1110), the information processing apparatus 102 (calling side) sends a failure response (488 Not Acceptable Here) to reject reception of the facsimile transmission. The information processing apparatus 102 (calling side) further sends a completion request (BYE) for completing the calling session (step S1112) after confirming reception of a confirmation message (ACK) from the information processing apparatus 103 (called side) (step S1111).

Finally, the information processing apparatus 102 (calling side) completes the call and media session after confirming reception of a success response (200 OK) from the information processing apparatus 103 (called side) (step S1113). When it is determined in step S1206 that reception of the facsimile transmission is allowed, a process according to the timing chart shown in FIG. 6 is performed.

Specifically, in step S1207, a T.38 media session is added (steps S609 to S611). Then, the information processing apparatus 102 (calling side) receives a completion request (BYE) for completing the calling session from the information processing apparatus 103 (called side) (step S613) after receiving facsimile data in step S1208 (step S612).

Finally, the information processing apparatus 102 (calling side) completes the call and media session after sending a success response (200 OK) to the information processing apparatus 103 (called side) (step S614).

In the aforementioned arrangement, an advantage can be achieved, in which, when a calling side does not need additional information from a called side, reception of the additional information can be rejected on the basis of conditions for rejecting reception configured by the user from an operation unit of a calling terminal. Specifically, the information processing apparatus 102 (calling side) can reject reception of facsimile transmission from the information processing apparatus 103 (called side) by registering, from the operation screen shown in FIG. 5, the address of the information processing apparatus 103 (called side) as an address, facsimile transmission from which being rejected.

Information of addresses, facsimile transmission from which being rejected, may be registered, as described above, by a user with administrator's authority sending the information to the information processing apparatuses 102 and 103 using a predetermined protocol. Moreover, when history of facsimile transmission requests related to addresses, facsimile transmission from which being rejected, is stored in an HDD or the like, the history can be examined by retrieving the history from a personal computer (PC) client or a server unit of an administrator on a network.

In the aforementioned exemplary embodiments, an arrangement is adopted, in which, a calling side does not disconnect facsimile communication after completion of facsimile transmission in real-time facsimile transmission according to, for example, SIP and T.38. In this arrangement, an information processing apparatus can be provided, with which a called side can reliably perform facsimile transmission, and the communication costs can be reduced.

The present invention further provides an information processing apparatus with which an option to allow or reject reception of facsimile transmission from a called side in real-time facsimile transmission according to SIP and T.38 can be selected.

The structure of data processing programs that can be read by the information processing apparatus according to an exemplary embodiment of the present invention will now be described with reference to a memory map shown in FIG. 13. FIG. 13 shows a memory map of a storage medium for storing various types of data processing program that can be read by the information processing apparatuses according to an exemplary embodiment of the present invention.

Although not shown, information for managing a group of programs stored in a storage medium, for example, version information and developers, and information that depends on an operating system (OS) and the like on a side that reads the programs, for example, icons for identifying the programs, may be stored.

Moreover, data associated with various types of program is also managed in the aforementioned directory. Moreover, a program for installing various types of program in a computer may be stored. When programs to be installed are compressed, a program for decompressing the programs may be stored.

The functions in the exemplary embodiments shown in FIGS. 10 and 12 may be performed by a host computer executing programs that are installed from an external source. In this case, the present invention is applicable even when a group of pieces of data including programs are supplied to a communication unit from a storage medium, such as a Compact Disc Read Only Memory (CD-ROM), a flash memory, or a floppy disk (FD), or an external storage medium via networks.

The present invention is also achieved by an embodiment in which a storage medium that stores program code of software that performs the functions according to the foregoing exemplary embodiments is provided to a system or an apparatus, and a computer (or a CPU, a micro processing unit (MPU), or the like) included in the system or the apparatus reads and executes the program code stored in the storage medium.

In this case, the program code read from the storage medium performs the novel functions according to the foregoing exemplary embodiments, and thus the present invention includes the storage medium, which records the program code.

The exemplary embodiments can be embodied in various forms, for example, object code, a program executed by an interpreter, script data provided for an OS, so long as they have the program functions described above.

The following media can be used as storage media that are used to supply the program code: for example, a flexible disk, a hard disk, an optical disk, a magneto-optical (MO) disk, a CD-ROM, a CD Recordable (CD-R), a CD rewritable (CD-RW), a magnetic tape, a nonvolatile memory card, a ROM, and a Digital Versatile Disc (DVD).

Moreover, in a method for supplying the programs, users may access a home page on the Internet using a browser on a client computer and then download the computer program according to the exemplary embodiments or a file that is generated by compressing the computer program and has an automatic installation function from the home page to a recording medium, for example, a hard disk. Moreover, in another method for supplying the programs, the program code constituting the programs according to the exemplary embodiments may be divided into a plurality of files, and then these files may be downloaded from different home pages. That is to say, a World Wide Web (WWW) server, a File Transfer Protocol (FTP) server, or the like that allows a plurality of users to download the program files for performing the functions according to the exemplary embodiments on a computer is also included in the scope of the present invention.

Moreover, the programs according to the exemplary embodiments may be encrypted and stored in a storage medium, for example, a CD-ROM, and distributed to users. Then, users who satisfy predetermined conditions may download key information for decryption from a home page through the Internet, and the encrypted programs may be decrypted using the key information and installed in a computer to implement the exemplary embodiments.

Moreover, an OS operating on a computer may execute some or all of the actual processing to perform the functions of the foregoing exemplary embodiments according to instructions from the program code.

Moreover, the program code read from the storage medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions of the foregoing exemplary embodiments according to instructions from the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-152945 filed Jun. 1, 2006, which is hereby incorporated by reference herein in its entirety.

What is claimed is:

1. A communication apparatus that communicates image data with an external apparatus connected to the communication apparatus via a network, the communication apparatus comprising:

a storage unit configured to store plural items of image data;

a receiving unit configured to establish a communication session with the external apparatus in response to a request from the external apparatus and receive image data from the external apparatus;

a transmitting unit configured to transmit the image data stored in the storage unit to the external apparatus using the communication session that has been established in response to the request from the external apparatus and that has been used by the receiving unit to receive the received image data;

a setting unit configured to set one transmission mode of a plurality of transmission modes, wherein the plurality of transmission modes includes at least a first transmission mode in which the image data stored in the storage unit is transmitted in response to the external apparatus that has sent a request for establishing the communication session being a specific external apparatus, and a second transmission mode in which the image data stored in the storage unit is transmitted regardless of which external apparatus that has sent a request for establishing the communication session is, wherein a transmission mode is set for each of the plural items of image data stored in the storage unit; and a control unit configured
to control the transmitting unit, in response to the first transmission mode being set by the setting unit, to execute transmission of at least two of the plural items of image data using the communication session that has been established in response to the request from the external apparatus and that has been used by the receiving unit to receive the received image data, in response to the external apparatus that has sent a request for establishing the communication session being the specific external apparatus, and not to execute transmission of the image data in response to the external apparatus that has sent a request for establishing the communication session not being the specific external apparatus, and to control the transmitting unit, in response to the second transmission mode being set by the setting unit, to execute transmission of at least two of the plural items of image data using the communication session that has been established in response to the request from the external apparatus and that has been used by the receiving unit to receive the received image data, regardless of which external apparatus that has sent a request for establishing the communication session is.

2. The communication apparatus according to claim 1, wherein transmission of the image data by the transmitting unit and reception of the image data by the receiving unit are executed in accordance with an SIP (Session Initiation Protocol).

3. The communication apparatus according to claim 1, wherein the transmitting unit starts transmission of the image data stored in the storage unit after receiving a signal indicating completion of transmission of image data from the external apparatus.

4. The communication apparatus according to claim 1, wherein the transmitting unit starts transmission of the image data stored in the storage unit before receiving a signal indicating completion of transmission of image data from the external apparatus, and performs transmission of the image data stored in the storage unit in parallel with reception of the image data by the receiving unit.

5. A control method for a communication apparatus that communicates image data with an external apparatus connected to the communication apparatus via a network, the control method comprising:

storing plural items of image data in a storage medium;

establishing a communication session with the external apparatus in response to a request from the external apparatus and receiving image data from the external apparatus;

transmitting the image data stored in the storage medium to the external apparatus using the communication session that has been established in response to the request from the external apparatus and that has been used to receive the received image data;

setting one transmission mode of a plurality of transmission modes, wherein the plurality of transmission modes includes at least a first transmission mode in which the image data stored in the storage medium is transmitted in response to the external apparatus that has sent a request for establishing the communication session being a specific external apparatus, and a second transmission mode in which the image data stored in the storage medium is transmitted regardless of which external apparatus that has sent a request for establishing the communication session is, wherein a transmission mode is set for each of the plural items of image data stored in the storage medium; and controlling the transmitting, in response to the first transmission mode being set, to execute transmission of at least two of the plural items of image data using the communication session that has been established in response to the request from the external apparatus and that has been used for receiving the received image data, in response to the external apparatus that has sent a request for establishing the communication session being the specific external apparatus, and not to execute transmission of the image data in response to the external apparatus that has sent a request for establishing the communication session not being the specific external apparatus, and controlling the transmitting, in response to the second transmission mode being set, to execute transmission of at least two of the plural items of image data using the communication session that has been established in response to the request from the external apparatus and that has been used for receiving the received image data, regardless of which external apparatus that has sent a request for establishing the communication session is.

6. A non-transitory computer-readable storage medium storing a program for causing a computer to execute the control method according to claim 5.

* * * * *